US006667564B1

(12) United States Patent
Bui et al.

(10) Patent No.: US 6,667,564 B1
(45) Date of Patent: Dec. 23, 2003

(54) MECHANICALLY-COMMUTATED DC MOTOR

(75) Inventors: Tanh M. Bui, Cary, NC (US); Bruce Q. Du, Apex, NC (US); Jeffrey D. Mobley, Apex, NC (US)

(73) Assignee: Buehler Motor, Inc., Cary, NC (US)

( * ) Notice: Subject to any disclaimer, the term of this patent is extended or adjusted under 35 U.S.C. 154(b) by 18 days.

(21) Appl. No.: 10/225,245

(22) Filed: Aug. 22, 2002

(51) Int. Cl.$^7$ .......................... H02K 1/00; H02K 13/04
(52) U.S. Cl. ...................... 310/233; 310/233; 310/237; 310/236
(58) Field of Search ................................ 310/233, 237, 310/245, 68 A, 68 E

(56) References Cited

U.S. PATENT DOCUMENTS

| | | |
|---|---|---|
| 3,426,223 A | 2/1969 | Vaughan |
| 3,566,851 A | 3/1971 | Pfrommer |
| 4,782,255 A | 11/1988 | Oosaka et al. |
| 5,283,405 A * | 2/1994 | Nolte ............................ 200/80 |
| 5,753,990 A | 5/1998 | Flynn et al. |
| 5,770,902 A * | 6/1998 | Batten .......................... 310/71 |

OTHER PUBLICATIONS

"Brushless Motors", *Technology Handbook*, Parker Automation Electromechanical Division, pp. A17–A19 (no date).

* cited by examiner

*Primary Examiner*—Nestor Ramirez
*Assistant Examiner*—Iraj A. Mohandesi
(74) *Attorney, Agent, or Firm*—Jacobson Holman PLLC

(57) ABSTRACT

A mechanically-commutated DC motor has a mechanical commutation system and an "inside-out" configuration, in which the stator assembly comprises the windings and the rotor assembly comprises the permanent magnet. The motor includes a rotor assembly, a stator assembly, a plurality of terminating conductive pads, and positive and negative stationary power supply terminals. The stator assembly includes a plurality of lamination stacks positioned around a central aperture and a plurality of copper coils, each coil being wound around one of the lamination stacks. The rotor assembly includes a rotor body with a permanent magnet ring and a non-conductive timing cam integrated into one face of the rotor body. The permanent magnet ring is radially magnetized in an alternating polarity pattern with at least one pair of poles. The mechanical commutation system comprises the timing cam integrated into the rotor assembly, the power supply terminals, and the conductive pads. There are the same number of conductive pads as stator coils. Each conductive pad has first and second flexible contacts selectively movable into and out of electrical contact with the positive and negative power supply terminals, respectively, in response to the action of the timing cam. Adjacent ends of adjacent coils terminate on a common conductive pad, so that the ends of each coil terminate on two different conductive pads, and each conductive pad receives the ends of two different coils.

26 Claims, 4 Drawing Sheets

MECHANICALLY-COMMUTATED DC MOTOR

FIELD OF THE INVENTION

The invention relates to a mechanically-commutated DC motor. In particular, it relates to a mechanically-commutated DC motor in which the stator assembly comprises the windings and the rotor assembly comprises the permanent magnet.

BACKGROUND OF THE INVENTION

A conventional DC brush motor 100, shown in FIG. 7, gets its name from the brush commutation system, which includes stationary brushes and rotating commutator bars. In a permanent magnet DC brush motor, the stator assembly comprises the permanent magnet and the rotor assembly comprises the windings. The stator 110 of a permanent magnet DC motor will have two or more permanent magnet pole pieces 110a and 110b. The opposite polarities of the energized winding 102 and the stator magnets attract, causing the rotor to rotate until it is aligned with the stator 110. Just as the rotor reaches alignment, the brushes 114 move across the commutator bars 112 and energize the next winding. The commutator bars 112 and brushes 114 result in the reversal of current being made automatically, so the rotor continues to turn in the same direction. The integrated commutation system results in permanent magnet DC brush motors being cost effective and easy to control.

A conventional DC brushless motor 100' is shown in FIG. 8. Compared to a DC brush motor, a conventional DC brushless motor has an "inside-out" configuration. In other words, the permanent magnet 110' becomes the rotating part and the windings 102' are placed on the stator poles 110'. Unlike a conventional DC brush motor, a DC brushless motor 100' cannot be driven by simply connecting it to a source of direct current. An electronic amplifier or driver 112' is used to perform the commutation electronically in response to low-level signals from an optical or hall-effect sensor 114'. The current in the external circuit must be reversed at defined rotor positions. Hence, the DC brushless motor 100' is actually being driven by an alternating current through an electronic amplifier or driver 116', which is connected directly to a direct current source.

The "inside-out" configuration commonly used in DC brushless motors improves motor thermal characteristics and has better flux distribution, resulting in a better torque-to-mass ratio.

BRIEF SUMMARY OF THE INVENTION

It is therefore a primary object of the present invention to provide a mechanically-commutated DC motor having the cost effectiveness and ease of control of conventional DC brush motors and the improved motor thermal characteristics, flux distribution, and torque-to-mass ratio characteristics of conventional DC brushless motors.

This and other objects of the invention are achieved by the provision of a DC motor having a mechanical commutation system and an "inside-out" configuration, in which the stator assembly comprises the windings and the rotor assembly comprises the permanent magnet. The mechanically commutated DC motor comprises a rotor assembly, a stator assembly, a plurality of terminating conductive pads, and first and second stationary power supply terminals (one of which is positive and one of which is negative). The stator assembly includes a plurality of lamination stacks positioned around a central aperture, a plurality of coil bobbins each being positioned on a corresponding lamination stack, and a plurality of copper coils, each coil being wound on a corresponding bobbin. The rotor assembly includes a rotor body with a permanent magnet ring, a non-conductive timing cam integrated into one face of the rotor body, and a shaft. The rotor body is housed in the aperture of the stator assembly. The permanent magnet ring is radially magnetized in an alternating polarity pattern with at least one pair of poles.

The mechanical commutation system comprises the timing cam, the power supply terminals, and the conductive pads. In general, if there are c stator coils, there are a corresponding number c of conductive pads. Each conductive pad has first and second flexible, inwardly-extending contacts selectively movable into and out of electrical contact with the positive and negative power supply terminals, respectively, in response to the action of the timing cam.

In one aspect of the invention, the stator assembly has three coils connected in a delta configuration, and the rotor body has two magnetized pole pairs.

In another aspect of the invention, the two power supply terminals are concentric, centered on the rotational axis of the rotor assembly, and positioned facing the timing cam. The conductive pads are positioned circumferentially around the outer of the two power supply terminals, with the flexible contacts extending into the aperture of the stator body and being interposed between the timing cam and the power supply terminals. Adjacent ends of adjacent coils terminate on a common conductive pad, so that the ends of each coil terminate on two different conductive pads, and each conductive pad receives the ends of two different coils.

DETAILED DESCRIPTION OF THE INVENTION

Figure 1:
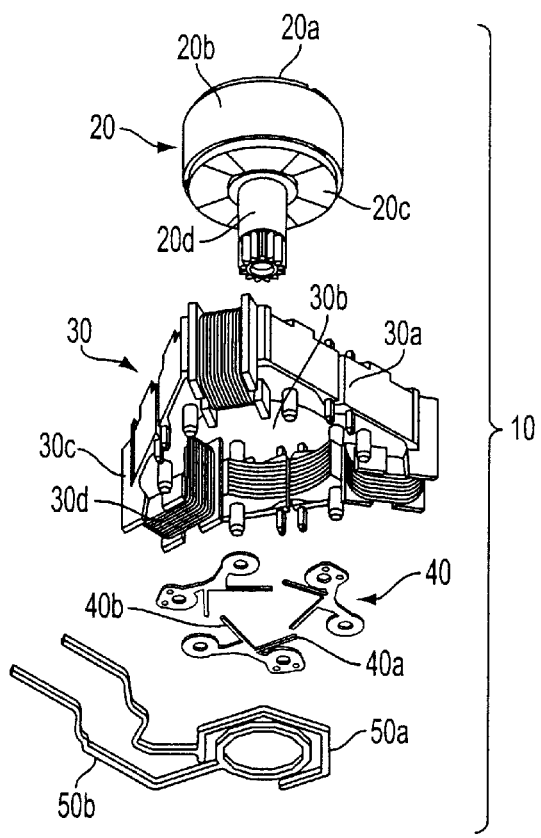
FIG. 1 is an exploded view of a mechanically commutated DC motor in accordance with the present invention.
Figure 2:
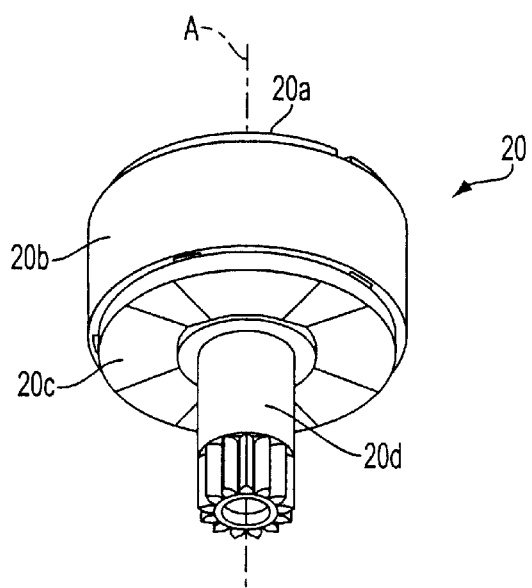
FIG. 2 is an enlarged view of the rotor assembly.
Figure 3:
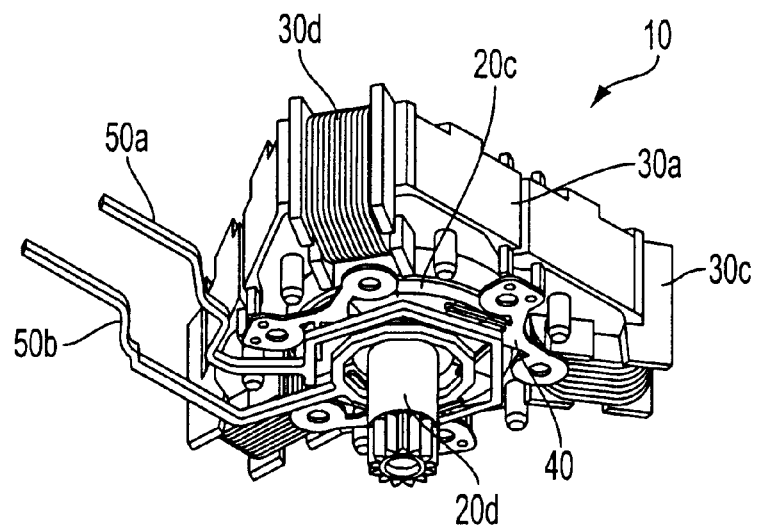
FIG. 3 is a bottom perspective view of the motor of FIG. 1.
Figure 4:
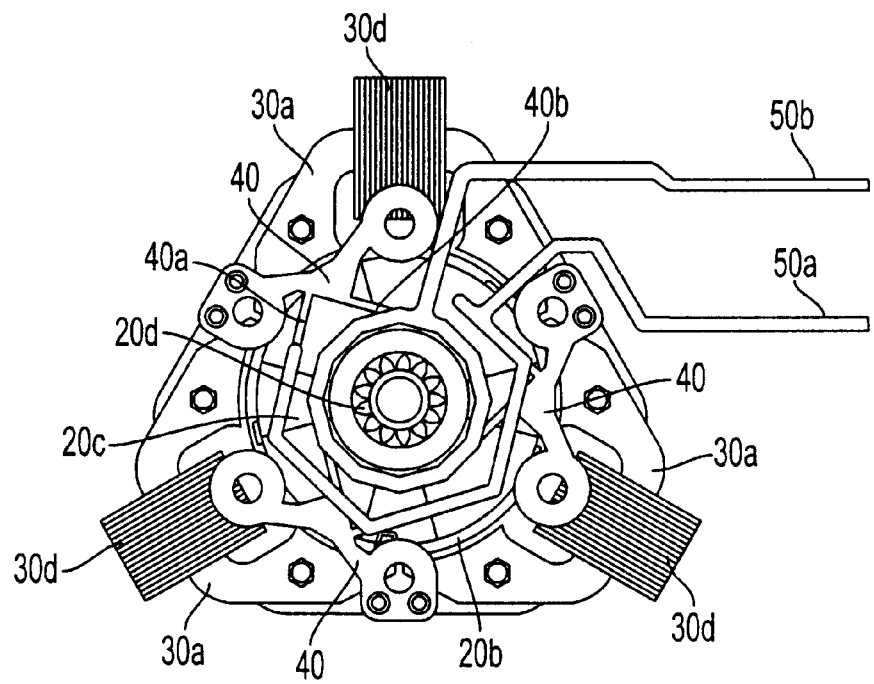
FIG. 4 is a bottom plan view of the motor of FIG. 1, with the bobbins omitted for clarity.
Figure 5:
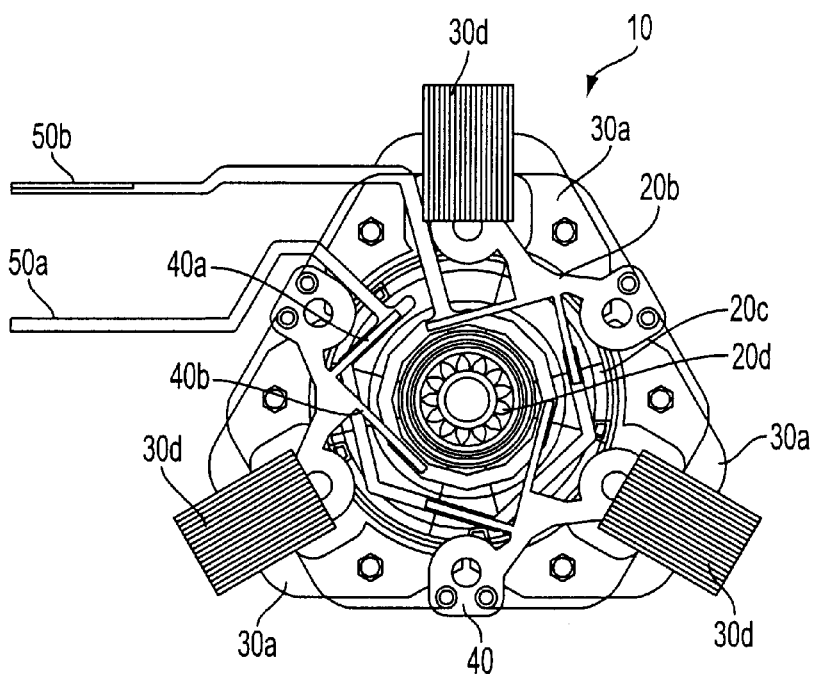
FIG. 5 is a top plan view of the motor of FIG. 1, with the bobbins omitted for clarity.

Referring now to FIGS. 1–5 there is shown a DC motor 10 in accordance with the present invention having a mechanical commutation system and an "inside-out" configuration, in which the stator assembly 30 comprises the windings and the rotor assembly comprises the permanent magnet ring. The mechanical commutation system provides cost effectiveness and ease of control comparable to that associated with conventional DC brush motors. The "inside-out" configuration in accordance with the present invention provides improved motor thermal characteristics, flux distribution, and torque-to-mass ratio comparable to that associated with conventional DC brushless motors.

The mechanically commutated DC motor 10 comprises a rotor assembly 20 that rotates around an axis A, a stator assembly 30, a plurality of terminating conductive pads 40, and first and second stationary power supply terminals 50a and 50b (one of which is positive and one of which is negative). The stator assembly 30 includes multiple lamination stacks 30a positioned around a central aperture 30b centered on the axis A, multiple coil bobbins 30c, each coil bobbin 30c being centrally positioned on a corresponding one of the lamination stacks 30a, and multiple copper coils 30d, each coil 30d being wound on a corresponding one of the bobbins 30c. The rotor assembly 20 includes a rotor body 20a with a permanent magnet ring 20b, a non-conductive timing cam 20c integrated into one face of the rotor body 20a, and a shaft 20d, the rotor body 20a being housed in the aperture 30b of the stator assembly 30. The rotor body 20a and the shaft 20d are coaxial with the axis A. The permanent magnet ring 20b is radially magnetized in an alternating polarity pattern with at least one pair of poles (not shown).

In the embodiment shown in FIGS. 1–5, there are three lamination stacks 30a, which are approximately C-shaped. The bobbins 30c are oriented so that their axes are tangent to and coplanar with a circle centered on and perpendicular to the axis A of the rotor assembly 20. The stator assembly 30 has three coils 30d connected in a delta configuration, and the rotor body 20a has two magnetized pole pairs, shown diagrammatically in FIG. 6. However, it will be appreciated by those of ordinary skill in the art that other numerical configurations are also possible.

The two power supply terminals 50a and 50b are concentric, centered on the axis A, and positioned facing the timing cam 20c. The conductive pads 40 are positioned circumferentially around the outer of the two power supply terminals 50a and 50b. Each conductive pad 40 has first and second flexible contacts 40a and 40b extending into the aperture 30b and interposed between the timing cam 20c and the power supply terminals 50a and 50b. The flexible contacts 40a and 40b are selectively movable into and out of electrical contact with the positive and negative power supply terminals 50a and 50b, respectively, in response to the action of the timing cam 20c. Each of the coils 30d has two ends, with adjacent ends of adjacent coils 30d terminating on a common conductive pad 40. Thus, the ends of each coil 30d terminate on two different conductive pads 40, and each conductive pad 40 receives the ends of two different coils 30d.

In the embodiment shown in FIGS. 1–5, there are three conductive pads 40 and a corresponding number of stator coils 30d. More generally, if there are c stator coils 30d, there are a corresponding number c of conductive pads 40. In the embodiment shown in FIGS. 1–5, the first contacts 40a are spaced at 120° degree intervals from each other, the second contacts 40b are also spaced at 120° degree intervals from each other, and the first and second contacts 40a and 40b on each conductive pad 40 are spaced at an interval of 90°.

To facilitate commutation, the DC motor 10 uses a mechanical commutation system including the timing cam 20c integrated into the rotor assembly 20, the stationary power supply terminals 50a and 50b, and the conductive pads 40 electrically connected to the electrical terminating points of the stator coils 30d. The timing cam 20c is configured to achieve the desired commutation sequence shown in the TABLE. In the embodiment of FIGS. 1–5, the cam surface of the timing cam 20c comprises a plurality of wedge-shaped sections, specifically four alternating high and low 60° sections buffered by four 30° transition sections. The use of flexible contacts 40a and 40b enhances motor life and maintains a constant "brush" drop.

The timing cam 20c, which is integral with one face of the rotor body 20a on the side from which the shaft 20d extends, pushes the appropriate flexible contacts 40a and 40b of the conductive pads 40 into contact with either the positive or negative power supply terminal, energizing the associated coils 30d and generating motor torque due to magnetic attraction of the energized stator poles to the permanent magnet rotor poles. Under normal operating conditions, one of the first and second flexible contacts 40a and 40b of a first conductive pad 40 makes electrical contact with the positive terminal, the other of the first and second flexible contacts 40a and 40b of a second conductive pad 40 makes electrical contact with the negative terminal, and the flexible contacts 40a and 40b of a third conductive pad 40 are in electrical contact with neither, thus creating two parallel paths in the coils 30d, one path including the coil 30d both ends of which are connected to the closed flexible contacts 40a and 40b and the other path including the other two coils 30d.

When it is necessary to reverse the direction of current flowing through one of the coils 30d, the timing cam 20c pushes the appropriate flexible contact of the open conductive pad 40 into electrical contact with its corresponding power supply terminal (positive or negative, depending on the direction of rotation). The previously open conductive pad 40 then has the same potential as the conductive pad 40 that is already in electrical contact with that same power supply terminal, thus electrically shorting out the associated coil 30d (commutation). After a brief period of time, the timing cam 20c rotates out of contact with the electrical contact of the conductive pad 40 which was initially in contact with the same power supply terminal 50a or 50b that the previously open conductive pad is now in contact with, allowing it to retract, and allowing current to flow through the previously shorted coil 30d in the reverse direction. As in a conventional DC brush motor, this process is repeated c×p times, where c is the number of armature coils 30d and p is the number of magnet poles.

Figure 6:
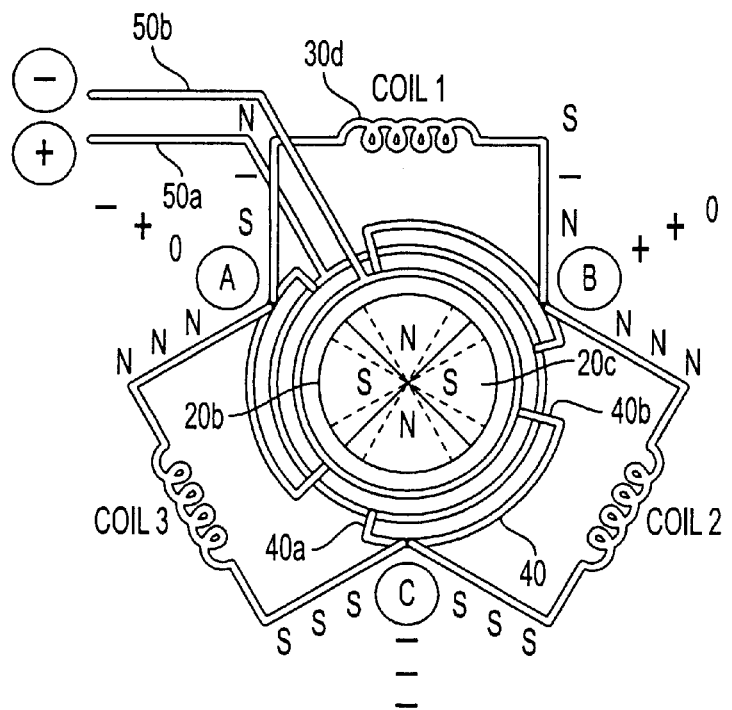
FIG. 6 is a diagram of a commutation sequence for the motor of FIG. 1.
Figure 7:
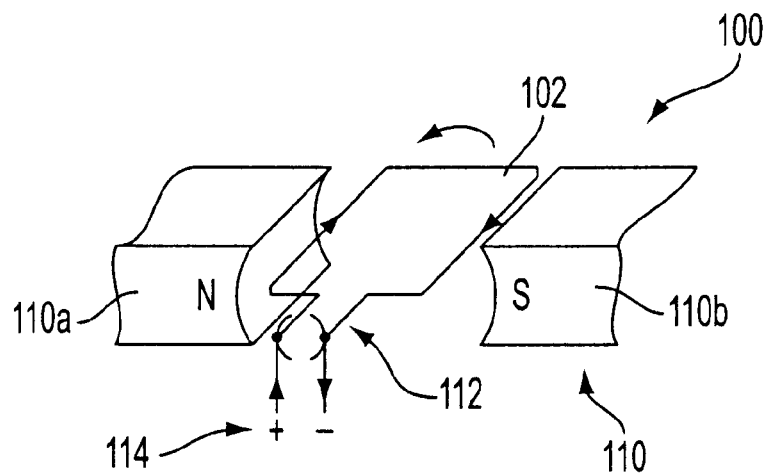
FIG. 7 is a diagrammatic view of a simple, conventional DC brush motor.
Figure 8:
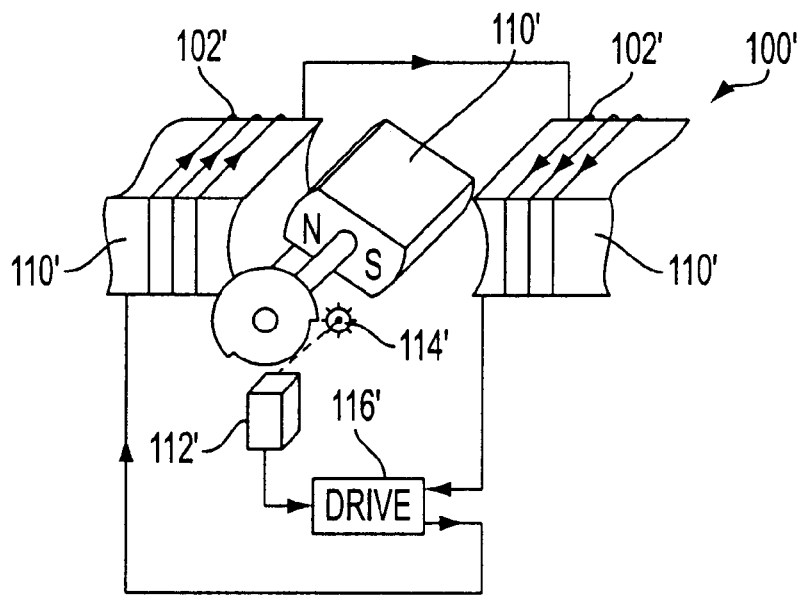
FIG. 8 is a diagrammatic view of a simple, conventional DC brushless motor.

Referring now to FIG. 6, there is shown a diagram of a commutation sequence for the DC motor 10. The first three rows (360°+ to 60°−) of the TABLE lists the status of the contacts 40a and 40b and the stator polarity for each of the coils 30d for the commutation sequence illustrated in FIG. 6, while the rest of the TABLE lists every additional commutation sequence during a revolution of the motor.

TABLE

Typical Commutation Sequence (CW operation of FIG. 6)

| Event | Angle | Contact Points | | | Stator Polarity | | | | | |
|---|---|---|---|---|---|---|---|---|---|---|
| | | A | B | C | Coil 1 | | Coil 2 | | Coil 3 | |
| | 360°+ to 30°− | Open | + | − | S | N | N | S | S | N |
| 1 | 30° | + | + | − | | | N | S | S | N |
| | 30°+ to 60°− | + | Open | − | N | S | N | S | S | N |
| 2 | 60° | + | − | − | N | S | | | S | N |
| | 60°+ to 90°− | + | − | Open | N | S | S | N | S | N |
| 3 | 90° | + | − | + | N | S | S | N | | |
| | 90°+ to 120°− | Open | − | + | N | S | S | N | N | S |

TABLE-continued

Typical Commutation Sequence (CW operation of FIG. 6)

| | | Contact Points | | | Stator Polarity | | | | | | |
|---|---|---|---|---|---|---|---|---|---|---|---|
| Event | Angle | A | B | C | Coil 1 | | Coil 2 | | Coil 3 | | |
| 4 | 120° | − | − | + | | | S | N | N | S | |
| | 120°+ to 150°− | − | Open | + | S | N | S | N | N | S | |
| 5 | 150° | − | + | + | S | N | | | N | S | |
| | 150°+ to 180°− | − | + | Open | S | N | N | S | N | S | |
| 6 | 180° | − | + | − | S | N | N | S | | | |
| | 180°+ to 210°− | Open | + | − | S | N | N | S | S | N | |
| 7 | 210° | + | + | − | | | N | S | S | N | |
| | 210°+ to 240°− | + | Open | − | N | S | N | S | S | N | |
| 8 | 240° | + | − | − | N | S | | | S | N | |
| | 240°+ to 270°− | + | − | Open | N | S | S | N | S | N | |
| 9 | 270° | + | − | + | N | S | S | N | | | |
| | 270°+ to 300°− | Open | − | + | N | S | S | N | N | S | |
| 10 | 300° | − | − | + | | | S | N | N | S | |
| | 300°+ to 330°− | − | Open | + | S | N | S | N | N | S | |
| 11 | 330° | − | + | + | S | N | | | N | S | |
| | 330°+ to 360°− | − | + | Open | S | N | N | S | N | S | |
| 12 | 360° | − | + | − | S | N | N | S | | | |
| | 360°+ to 30°− | Open | + | − | S | N | N | S | S | N | |

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

We claim:

1. A mechanically commutated DC motor comprising:

positive and negative stationary power supply terminals;

a stator assembly including a plurality of lamination stacks positioned around a central aperture and a plurality of coils, each coil being wound around a respective lamination stack, each of the coils having two ends;

a rotor assembly including a rotor body with a permanent magnet ring and a non-conductive timing cam on one face of the rotor body, the rotor body being positioned in the central aperture of the stator assembly;

a plurality of terminating conductive pads, the number of conductive pads corresponding to the number of coils, each conductive pad having first and second flexible contacts opposite the timing cam and selectively movable into and out of electrical contact with the positive and negative power supply terminals, respectively, in response to the action of the timing cam, each conductive pad being electrically connected to two different coils.

2. The motor of claim 1, wherein the stator assembly further includes a plurality of coil bobbins spaced around the stator body, each bobbin coil being positioned on a corresponding lamination stack, the coils being wound on corresponding bobbins.

3. The motor of claim 1, wherein the permanent magnet ring is radially magnetized in an alternating polarity pattern with at least one pole pair.

4. The motor of claim 1, wherein the stator assembly has three coils and the rotor body has two magnetized pole pairs, and wherein there are three conductive pads.

5. The motor of claim 4, wherein the coils are connected in a delta configuration.

6. The motor of claim 1, wherein the positive and negative power supply terminals are concentric, centered on the axis of rotation of the rotor assembly, and positioned opposite the timing cam.

7. The motor of claim 6, wherein the conductive pads are positioned circumferentially around the outer of the positive and negative power supply terminals.

8. The motor of claim 7, wherein the flexible contacts are interposed between the timing cam and the positive and negative power supply terminals.

9. The motor of claim 8, wherein adjacent ends of adjacent coils terminate on a common one of the conductive pads, the ends of each coil terminating on two different conductive pads, and each conductive pad receiving the ends of two different coils.

10. The motor of claim 1, wherein there are the same number of stator coils and conductive pads.

11. The motor of claim 1, wherein the stator assembly has three coils, the coils having ends having contact points A, B, and C, and wherein motor has commutation sequences as follows:

| | | Contact Points | | | Stator Polarity | | | | | | |
|---|---|---|---|---|---|---|---|---|---|---|---|
| Event | Angle | A | B | C | Coil 1 | | Coil 2 | | Coil 3 | | |
| | 360°+ to 30°− | Open | 0 | − | S | N | N | S | S | N | |
| 1 | 30° | 0 | 0 | − | | | N | S | S | N | |
| | 30°+ to 60°− | 0 | Open | − | N | S | N | S | S | N | |
| 2 | 60° | 0 | − | − | N | S | | | S | N | |
| | 60°+ to 90°− | 0 | − | Open | N | S | S | N | S | N | |

-continued

| Event | Angle | Contact Points | | | Stator Polarity | | | | | |
|---|---|---|---|---|---|---|---|---|---|---|
| | | A | B | C | Coil 1 | | Coil 2 | | Coil 3 | |
| 3 | 90° | 0 | – | 0 | N | S | S | N | | |
| | 90°+ to 120°– | Open | – | 0 | N | S | S | N | N | S |
| 4 | 120° | – | – | 0 | | | S | N | N | S |
| | 120°+ to 150°– | – | Open | 0 | S | N | S | N | N | S |
| 5 | 150° | – | 0 | 0 | S | N | | | N | S |
| | 150°+ to 180°– | – | 0 | Open | S | N | N | S | N | S |
| 6 | 180° | – | 0 | – | S | N | N | S | | |
| | 180°+ to 210°– | Open | 0 | – | S | N | N | S | S | N |
| 7 | 210° | 0 | 0 | – | | | N | S | S | N |
| | 210°+ to 240°– | 0 | Open | – | N | S | N | S | S | N |
| 8 | 240° | 0 | – | – | N | S | | | S | N |
| | 240° + to 270°– | 0 | – | Open | N | S | S | N | S | N |
| 9 | 270° | 0 | – | 0 | N | S | S | N | | |
| | 270°+ to 300°– | Open | – | 0 | N | S | S | N | N | S |
| 10 | 300° | – | – | 0 | | | S | N | N | S |
| | 300°+ to 330°– | – | Open | 0 | S | N | S | N | N | S |
| 11 | 330° | – | 0 | 0 | S | N | | | N | S |
| | 330°+ to 360°– | – | 0 | Open | S | N | N | S | N | S |
| 12 | 360° | – | 0 | – | S | N | N | S | | |
| | 360°+ to 30°– | Open | 0 | – | S | N | N | S | S | N. |

12. The motor of claim 1, wherein the timing cam has a cam surface comprising a plurality of alternating high and low wedge-shaped sections buffered by a corresponding number of wedge-shaped transition sections.

13. The motor of claim 1, wherein the first contacts are spaced at 120° degree intervals from each other, the second contacts are also spaced at 120° degree intervals from each other, and the first and second contacts on each conductive pad are spaced at an interval of 90°, and wherein the timing cam has a cam surface comprising four alternating high and low wedge-shaped sections buffered by four wedge-shaped transition sections, each pair of high and low wedge-shaped sections forming an angle of 60° and each transition section forming an angle of 30°.

14. A mechanically commutated DC motor comprising:
positive and negative power supply terminals;
a stator assembly including a plurality of coils spaced therearound, each of the coils having two ends;
a rotor assembly including a rotor body with a permanent magnet ring and a non-conductive timing cam on one face of the rotor body, the rotor body being positioned within the stator assembly;
a plurality of terminating conductive pads, the number of conductive pads corresponding to the number of coils, each conductive pad having first and second flexible contacts selectively movable into and out of electrical contact with the positive and negative power supply terminals, respectively, in response to the action of the timing cam, with the ends of each coil terminating on two different conductive pads, and each conductive pad receiving the ends of two different coils.

15. The motor of claim 14, wherein the stator assembly further includes a plurality of lamination stacks, each coil being wound around a respective lamination stack.

16. The motor of claim 14, wherein the permanent magnet ring is radially magnetized in an alternating polarity pattern with at least one pole pair.

17. The motor of claim 14, wherein the stator assembly has three coils and the rotor body has two magnetized pole pairs, and wherein there are three conductive pads.

18. The motor of claim 17, wherein the coils are connected in a delta configuration.

19. The motor of claim 14, wherein the positive and negative power supply terminals are concentric, centered on the axis of rotation of the rotor assembly, and positioned opposite the timing cam.

20. The motor of claim 19, wherein the conductive pads are positioned circumferentially around the outer of the positive and negative power supply terminals.

21. The motor of claim 20, wherein the flexible contacts are interposed between the timing cam and the positive and negative power supply terminals.

22. The motor of claim 21, wherein adjacent ends of adjacent coils terminate on a common one of the conductive pads, the ends of each coil terminating on two different conductive pads, and each conductive pad receiving the ends of two different coils.

23. The motor of claim 14, wherein there are the same number of stator coils and conductive pads.

24. The motor of claim 14, wherein the stator assembly has three coils, the coils having ends having contact points A, B, and C, and wherein motor has commutation sequences as follows:

| Event | Angle | Contact Points | | | Stator Polarity | | | | | |
|---|---|---|---|---|---|---|---|---|---|---|
| | | A | B | C | Coil 1 | | Coil 2 | | Coil 3 | |
| | 360°+ to 30°– | Open | 0 | – | S | N | N | S | S | N |
| 1 | 30° | 0 | 0 | – | | | N | S | S | N |
| | 30°+ to 60°– | 0 | Open | – | N | S | N | S | S | N |
| 2 | 60° | 0 | – | – | N | S | | | S | N |
| | 60°+ to 90°– | 0 | – | Open | N | S | S | N | S | N |

-continued

| Event | Angle | Contact Points | | | Stator Polarity | | | | | |
|---|---|---|---|---|---|---|---|---|---|---|
| | | A | B | C | Coil 1 | | Coil 2 | | Coil 3 | |
| 3 | 90° | 0 | – | 0 | N | S | S | N | | |
| | 90°+ to 120°– | Open | – | 0 | N | S | S | N | N | S |
| 4 | 120° | – | – | 0 | | | S | N | N | S |
| | 120°+ to 150°– | – | Open | 0 | S | N | S | N | N | S |
| 5 | 150° | – | 0 | 0 | S | N | | | N | S |
| | 150°+ to 180°– | – | 0 | Open | S | N | N | S | N | S |
| 6 | 180° | – | 0 | – | S | N | N | S | | |
| | 180°+ to 210°– | Open | 0 | – | S | N | N | S | S | N |
| 7 | 210° | 0 | 0 | – | | | N | S | S | N |
| | 210°+ to 240°– | 0 | Open | – | N | S | N | S | S | N |
| 8 | 240° | 0 | – | – | N | S | | | S | N |
| | 240° + to 270°– | 0 | – | Open | N | S | S | N | S | N |
| 9 | 270° | 0 | – | 0 | N | S | S | N | | |
| | 270°+ to 300°– | Open | – | 0 | N | S | S | N | N | S |
| 10 | 300° | – | – | 0 | | | S | N | N | S |
| | 300°+ to 330°– | – | Open | 0 | S | N | S | N | N | S |
| 11 | 330° | – | 0 | 0 | S | N | | | N | S |
| | 330°+ to 360°– | – | 0 | Open | S | N | N | S | N | S |
| 12 | 360° | – | 0 | – | S | N | N | S | | |
| | 360°+ to 30°– | Open | 0 | – | S | N | N | S | S | N. |

25. The motor of claim 14, wherein the timing cam has a cam surface comprising a plurality of alternating high and low wedge-shaped sections buffered by a corresponding number of wedge-shaped transition sections.

26. The motor of claim 14, wherein the first contacts are spaced at 120° degree intervals from each other, the second contacts are also spaced at 120° degree intervals from each other, and the first and second contacts on each conductive pad are spaced at an interval of 90°, and wherein the timing cam has a cam surface comprising four alternating high and low wedge-shaped sections buffered by four wedge-shaped transition sections, each pair of high and low wedge-shaped sections forming an angle of 60° and each transition section forming an angle of 30°.

* * * * *